Nov. 24, 1959  C. ALLANDER  2,914,648
VENTILATING UNIT PROVIDED WITH AN ELECTRIC HEATER
Filed June 10, 1958
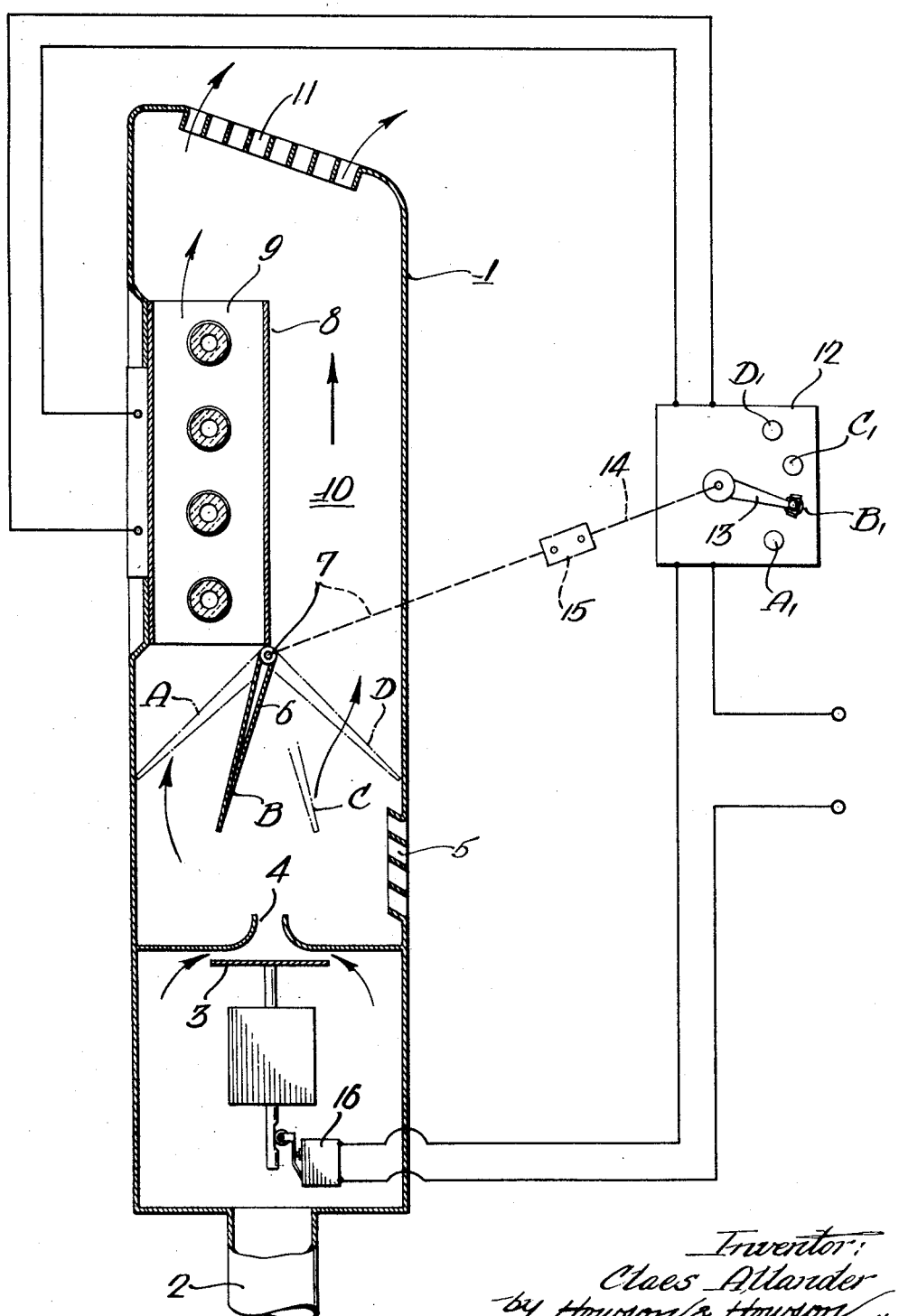
Inventor:
Claes Allander
by Howson & Howson Attys.

United States Patent Office 2,914,648
Patented Nov. 24, 1959

2,914,648

VENTILATING UNIT PROVIDED WITH AN ELECTRIC HEATER

Claes Allander, Sodra Angby, Sweden, assignor to Aktiebolaget Svenska Flaktfabriken, Stockholm, Sweden Application June 10, 1958, Serial No. 741,442

Claims priority, application Sweden June 13, 1957

1 Claim. (Cl. 219—39)

The present invention relates to a ventilating unit provided with an electric heater for final treatment of a mixture of primary air and ejected local air, said primary air being supplied under pressure and maintained constant by means of a volume governor. In the unit the condition of the mixture is adjusted by proportioning the flow of the mixture through said heater and through a by-pass adjacent said heater by means of a manually adjusted damper.

In ventilating units of this type with steam or hot water radiators, the heating effect of the radiators will vary with the passing air quantity. In opposition to this, electric heaters give a constant heating effect and there is therefore a risk for overheating when owing to regulation the air quantity passing through the heater is reduced or entirely shut off. Furthermore, from economical viewpoints more heating effect should not be supplied to the heater than is necessary for the air quantity which is present.

The invention, the object of which is to eliminate said drawbacks, is characterized in that the damper of the ventilating unit is arranged to co-operate with a regulating device for changing step by step the effect of the heater and in that the volume governor is arranged to entirely shut off the heater when, owing to an unsufficient pressure of the supplied primary air, the air quantity falls below a predetermined minimum value. The regulating device for changing step by step the heating effect of the heater is arranged to co-operate directly with the shaft of the damper.

The invention will now be described more in detail with reference to the accompanying drawing showing an exemplifying embodiment of the ventilating unit in accordance with the invention.

In the drawing a ventilating unit 1 has a duct 2 for supplying primary air to the unit through a nozzle 4. A volume governor 3 maintains the quantity of primary air passing through the nozzle 4 constant. 5 designates an opening for the supply of ejected local air. A damper 6 is mounted on its shaft 7 to proportion the flow of the mixture of primary and secondary (local) air through an electric heater 9 and through a by-pass 10, arranged close by said heater and shielded from it by means of a partition 8. 11 designates an outlet opening for the finally treated air mixture.

In accordance with the invention the damper 6 is arranged to cooperate with a regulating device 12 for changing step by step the heating effect of the heater. In the illustrated embodiment this co-operation is carried out by means of the shaft 7 of the damper, said shaft being connected with a shaft 14 of the regulating device by means of a coupling 15. By means of a switch arm 13 on the shaft 14, different heating effects can be supplied to the electric heater by causing the switch arm 13 to contact the contact points A1, B1, C1, D1 corresponding to the different positions A, B, C, D of the damper. When the damper 6 is in the position A the arm 13 contacts the point A1, whereby the electric heater is entirely shut off. By turning the damper towards the position D, an increase in the heating effect of the heater will follow, resulting in a calculated maximum effect at the final position.

To eliminate the risk of overheating the electric heater, when the supply of primary air is entirely shut off or when, owing to an unsufficient pressure, the air quantity falls below a predetermined minimum value, a circuit breaker 16 is connected in series in the circuit with said regulating device 12 which device is arranged to co-operate with the volume governor 3. The location of the regulating device 12 and the connection between this and the damper 6 can be varied without departing from the scope of the invention.

What I claim is:

A ventilating unit comprising means to receive primary air supplied under pressure, means to receive secondary local air, said primary and secondary air being mixed in said unit, an electric heater for treating the mixture of primary and secondary air, a by-pass adjacent said heater for diverting a portion of the mixture of primary and secondary air around said heater, a proportioning damper for proportioning the flow of the mixture through said heater and said by-pass, a regulating device conected to said damper for changing the effect of said heater in accordance with the proportion of air flowing therethrough, a volume governor operable in response to the pressure of said supplied primary air to maintain the flow thereof into said unit constant, and means connected to said volume governor operable upon said regulating device to shut off the heater when the flow of the primary air falls below a predetermined minimum value as a result of insufficient pressure in said primary air supply.

References Cited in the file of this patent

UNITED STATES PATENTS

| 1,993,521 | Parsons | Mar. 5, 1935 |
| 2,058,252 | Parsons | Oct. 20, 1936 |
| 2,441,726 | Smith | May 18, 1948 |
| 2,449,755 | Taylor | Sept, 21, 1948 |